United States Patent [19]

Budin et al.

[11] Patent Number: 5,305,350
[45] Date of Patent: Apr. 19, 1994

[54] MULTIMEDIA HIGH SPEED NETWORK

[75] Inventors: Dan Budin, Newton; Yoseph Linde, Needham; Gordon Saussy, Brighton; Robert Snyder, Westford; Jack W. Lee, Brookline, all of Mass.

[73] Assignee: Chipcom Corporation, Scarborough, Mass.

[21] Appl. No.: 535,033

[22] Filed: Jun. 8, 1990

[51] Int. Cl.$^5$ .............................................. H04L 25/03
[52] U.S. Cl. ...................................... 375/12; 359/161; 375/36; 375/37; 375/60
[58] Field of Search ............... 375/12, 36, 37, 60; 370/85.9, 85.13, 85.14, 94.1; 455/601, 606, 611, 612; 359/115, 119, 120, 152, 153, 154, 161, 164, 167, 184, 189

[56] References Cited

U.S. PATENT DOCUMENTS

| | | | |
|---|---|---|---|
| 4,764,939 | 8/1988 | Rogers | 375/36 |
| 4,768,188 | 8/1988 | Barnhart | 370/105.1 |
| 4,835,768 | 5/1989 | Hubbard | 370/106 |
| 4,850,042 | 7/1989 | Petrinio et al. | 359/176 |
| 4,885,795 | 12/1989 | Bunting et al. | 375/36 |
| 4,899,383 | 2/1990 | Einolf, Jr. et al. | 375/114 |
| 4,908,823 | 3/1990 | Haagens et al. | 375/8 |
| 4,983,010 | 1/1991 | Popp | 359/120 |
| 4,984,248 | 1/1991 | Hong | 375/36 |
| 5,018,142 | 5/1991 | Simcoe | 370/99 |
| 5,025,459 | 6/1991 | Lill | 370/106 |
| 5,029,333 | 7/1991 | Graves et al. | 370/110.1 |
| 5,068,880 | 11/1991 | Kline et al. | 370/106 |

OTHER PUBLICATIONS

Journal of Solid State Circuits vol. SC-21 No. 6 Dec. 1986 pp. 909-915 "Integrated Circuits for 200 Mbit/sec Fiber-Optic Link".

Tannenbaum, Andrew S., "Computer Networks" Prentice-Hall Inc 1989 pp. 166-170.
"Contribution to IEEE Project 802.6 on Metropolitan Area Networks", Oct. 30, 1984, Isaman et al.

*Primary Examiner*—Benedict V. Safourek
*Attorney, Agent, or Firm*—McGlew and Tuttle

[57] ABSTRACT

A system is provided implementing an extremely high speed link allowing selection of either twisted pair (or like media) and fiber media in a single local area network to provide a high speed multimedia local area network. A high speed transmission link for twisted pair, coaxial cable media or the like is provided including a transmitter with a conversion device for receiving fiber optic data interface signals intended to drive a fiber optic data interface and for converting said fiber optic data interface signals into high speed transmission link signals of a form suitable to drive a shielded twisted pair medium. A receiver is provided including reconversion apparatus for regenerating the signal received from the shielded twisted pair medium back to an adequate signal level. The transmitter conversion device includes a buffer cooperating with an equalizer and a filter for forming the high speed transmission link signal. The equalizer provides frequency domain compensation for the characteristics of the shielded twisted pair medium. The filter rejects signals outside a band of data signaling. The receiver reconversion apparatus includes a filter connected to said twisted pair medium to reject signals outside a band of data signaling and to limit radiated emissions and a buffer for regenerating the signal received from the shielded twisted pair and filtration by said filter and regenerating the signal back to an adequate signal level.

18 Claims, 9 Drawing Sheets

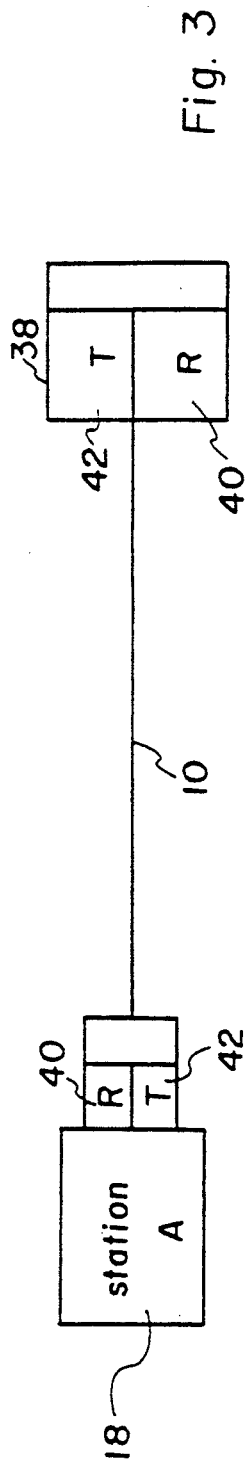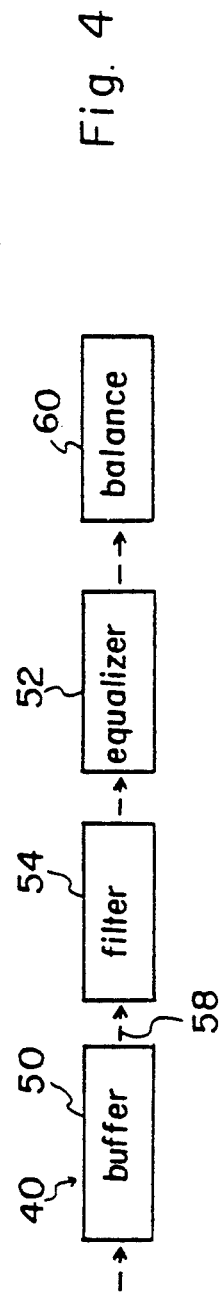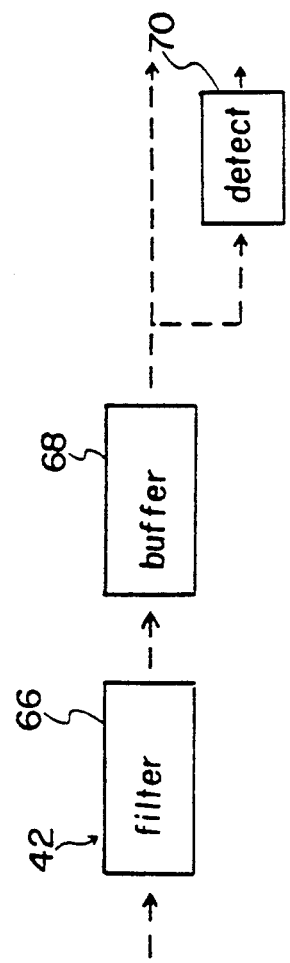

MULTIMEDIA HIGH SPEED NETWORK

BACKGROUND OF THE INVENTION

1. Field of the Invention

The present invention relates in general to local area network implementations and more particularly to the Fiber Distributed Data Interface (FDDI) defined by the ANSI X3T9.5 standard.

2. Brief Description of Related Prior Art

The standard which defines FDDI specifies a local area network based on point-to-point fiber optic links arranged to form a ring. Extremely high data rates are involved: The data rate on these links is 100 megabits per second, encoded to run at 125 megabauds. Given the extremely high data rate, the standard specifies only fiber optic media implementations of the network.

Lower speed networking standards have been specified to run on lower cost copper media. For example, IEEE standard 802.5 specifies networks which are similar in concept to the FDDI. These networks run at 4 or 16 megabits per second (8 or 32 megabauds after encoding) on a shielded twisted pair medium. This IEEE standard 802.5, also known as a token passing ring network is also implemented as a series of point-to-point links connected to form a ring. Other standards, such as IEEE standard 802.3 10Base-T, specify an unshielded twisted pair medium for up to 20 megabaud signaling.

Fiber optic media has some desirable aspects for communication systems. For example, fiber optic media provide high security, as compared to copper media with their associated radiated emissions. Fiber media provide capacity for speeds up to gigabauds. Additionally, fiber media can support link distances up to two kilometers. Unfortunately, the costs associated with these media are very high.

Copper media, such as twisted pair, provide a much more cost effective solution for shorter links. Efficiency for short links is extremely important as studies have shown that most links in a typical local area network are less than 100 meters in length. Accordingly, the need to link distances up to two kilometers is often not a significant consideration. The high costs of the fiber media may often be a very great consideration.

SUMMARY AND OBJECTS OF THE INVENTION

It is an object of the invention to provide a multimedia, extremely high speed network which offers users a choice of either fiber optic or twisted pair media for implementing a fiber distributed data interface, such that the user may choose the best, most practical or most efficient medium for each link of the network, based on cost, link distance and other requirements.

It is an object of the invention to provide an extremely high speed network which employs twisted pair media for one or more links of the network and which operates at FDDI rates of up to 125 megabauds.

According to the invention, a high speed transmission link is provided for twisted pair media (in this text twisted pair media includes similar media such as shielded twisted pair and coaxial cable media) comprising a transmitter with conversion means for receiving fiber optic data interface type electrical signals intended to drive a fiber optic data interface and for converting these signals into high speed transmission link signals of a form suitable to drive a twisted pair medium. The transmitter conversion means includes a buffer which receives the fiber optic data interface type electrical signals (at digital logic levels) and converts these signals into signals suitable to drive the selected medium, such as twisted pair medium, via an equalizer and filter. The equalizer provides frequency domain compensation for the characteristics of the shielded twisted pair medium. The filter rejects signals outside the band of the data signaling, to limit radiated emissions. The transmitter further includes a balancing circuit for receiving the resulting signal from the conversion means and for coupling the converted signals onto a shielded twisted pair and for ensuring signal balance on the two twisted wires of the medium for promoting good signal quality and also reducing radiated emissions. A receiver is provided which includes a filter, a buffer and a signal detect circuit. The filter serves mainly to reject signals outside the band of the data signaling, to limit radiated emissions. The buffer receives signals from the filter and serve to regenerate the signal received from the shielded twisted pair medium back to adequate signal levels. The signal detect circuit receives the signal from the buffer and distinguishes between the presence and absence of an input signal. The output of the signal detect circuit is a logical indication of signal presence.

According to a preferred embodiment of the invention, the transmitter buffer employs a single emitter-coupled logic line drive, with impedance matching performed at its output terminals. The equalizer is implemented with fixed, discrete passive circuit elements. (The equalizer may also be implemented with digital equalization methods). The filters are preferably implemented with discrete passive components. According to a preferred form of the invention, the balancing circuit is implemented with a transformer arrangement.

According to the preferred embodiment the receiver filter is implemented with discrete passive components. The receiver buffer is implemented in the preferred embodiment with cascaded line receivers designed in the emitter-coupled logic technology.

The signal detect circuit is preferably implemented using a peak detector circuit known from the emitter-coupled logic technology, followed by a buffering gate.

According to another feature of the invention, a high speed modular networking concentrator is provided both for shielded twisted pair and fiber optic connections on a user selectable and interchangeable basis. This structure allows the user or designer of an FDDI network to configure each link individually for either fiber optic or shielded twisted pair media. The arrangement includes a concentrator platform providing a base into which a user may install modules serving the desired connection needs. The concentrator platform includes power and central control means for providing power and central control to installed modules. Media dependent modules are provided wherein each media dependent module offers either a fiber optic or twisted pair connection for 125 megabaud data rates. The arrangement employs the high speed transmission link for implementation of the twisted pair links. The arrangement allows the user to flexibly configure networks to include both types of link.

The various features of novelty which characterize the invention are pointed out with particularity in the claims annexed to and forming a part of this disclosure. For a better understanding of the invention, its operating advantages and specific objects attained by its uses reference is made to the accompanying drawings and descriptive matter in which a preferred embodiment of the invention is illustrated.

BRIEF DESCRIPTION OF THE DRAWINGS

In the drawings:

FIG. 3 is a schematic view showing an extremely high speed transmission link according to the invention;

FIG. 4 is a schematic view of an extremely high speed transmission link transmitter according to the invention;

FIG. 5 is a schematic view of an extremely high speed transmission link receiver according to the invention;

FIG. 9b is a diagram illustrating the eye pattern output of the receiver with the input as shown in FIG. 9a.

DETAILED DESCRIPTION OF THE PREFERRED EMBODIMENT

Figure 1:
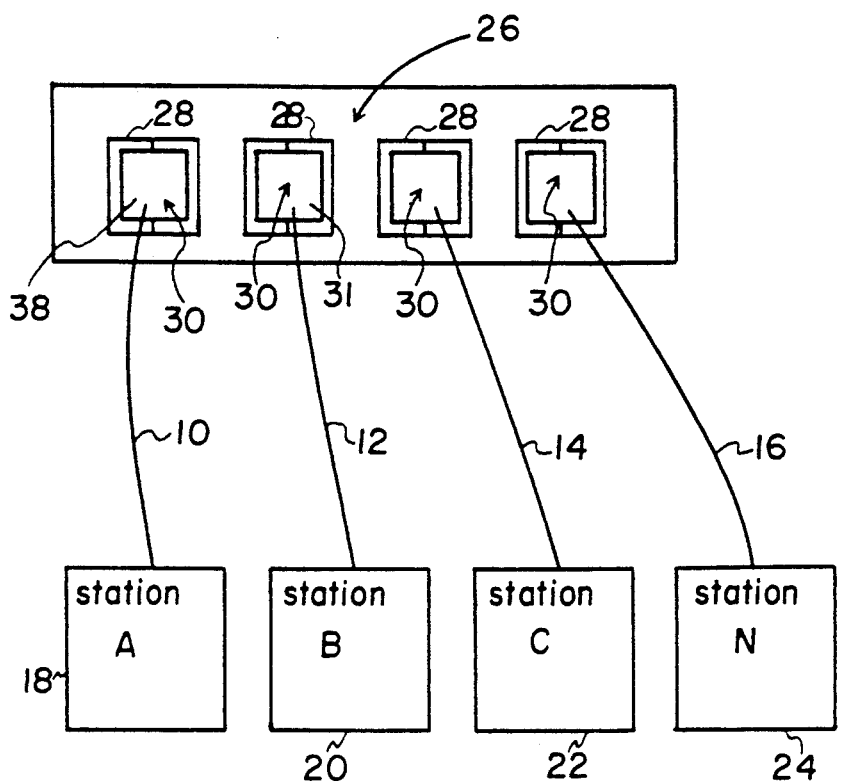
FIG. 1 is a schematic view showing a multimedia extremely high speed network according to the invention.

Referring to the drawings in particular, the invention embodied therein seen generally in FIG. 1 comprises a first extremely high speed transmission link 10, a second high speed transmission 12, a third high speed transmission link 14 and an Nth high speed transmission link 16. Each of the transmission links is connected to a remote station such as remote station A designated by 18, remote station B designated 20, remote station C designated 22 and remote station N designated 24. According to the invention, each of the links 10, 12, 14 and 16 are connected to a concentrator platform generally designated 26. The concentrator platform 26 includes a plurality of module slots 28 and is connected to each high speed transmission link by one of a plurality of media dependent modules 30 such as twisted pair module 38 or fiber module 31.

Each of the links 10, 12, 14 and 16 is of a length depending upon the distance between the associated station and the concentrator platform. According to the example shown in FIG. 1, the first link 10 is formed using twisted pair media. The second link 12 is also formed using twisted pair media. To highlight important aspects of the invention, in the example of FIG. 1 the third link 14 is provided using fiber optic media. The Nth link 16 may of course be twisted pair or fiber optic media.

Figure 2:
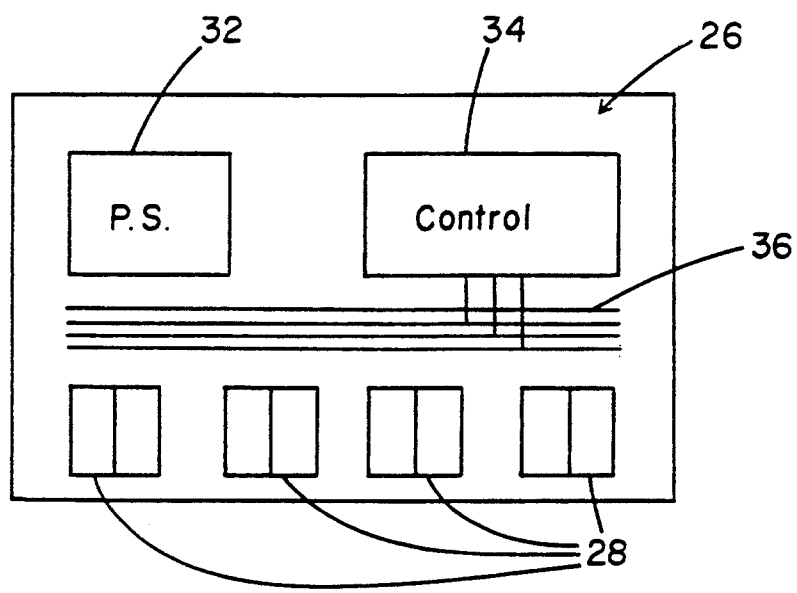
FIG. 2 is a schematic view showing a concentrator platform with media dependent module slots for media dependent modules.

As shown in FIG. 2, the concentrator platform 26 provides connection mean for the various slots 28 in which the modules 30 are connected. The concentrator platform 26 includes at least one power supply 32 supplying power to the installed modules 30. The concentrator platform 26 also includes central control means 34 providing central control of the installed modules over one or a plurality of connecting channels 36. Each media dependent module 30 is connected to a link 10, 12, 14, 16, and is adapted for the specific media, twisted pair, shielded twisted pair or coaxial, of the connected link. According to a preferred embodiment of the invention, the media dependent module may either be a fiber optic module or twisted pair module for 125 megabaud data rates. In the case of the twisted pair links, the arrangement uses the high speed transmission described below in detail. This allows the user flexibility in configuring networks so as to include both types of link as shown in the example of FIG. 1.

FIG. 3 shows a station such as station A connected to a media dependent module (a shielded twisted pair module) 38 via the shielded twisted pair link 10.

As seen in FIG. 3 each of the twisted pair media dependent modules such as module 38, includes a receiver 40 and transmitter 42 for the high speed transmission link according to the invention. Each of the stations, such as station A designated 18, which is connected by a twisted pair link such as link 10, includes a receiver and transmitter for the high speed transmission link according to the invention. The high speed transmission link shown in FIG. 3 allows implementation of a 125 megabaud link over shielded twisted pair media.

As seen in FIG. 4, the high speed transmission link transmitter includes a buffer 50 which receives electrical data interface signals intended to drive a fiber optic data interface. The buffer converts the signals into a high speed transmission link twisted pair signal suitable to drive a shielded twisted pair medium link via an equalizer 52 and a filter 54. According to the preferred embodiment, the buffer includes a single emitter-coupled logic gate with impedance matching performed at its output terminals 58.

The filter 54 primarily rejects signals outside the band of the data signaling. This limits radiated emissions. According to a preferred arrangement, the filter is formed with discrete passive components.

The equalizer 52 provides frequency domain compensation for the characteristics of the shielded twisted pair media. According to the preferred embodiment, the equalizer is implemented employing fixed, discrete passive circuit elements. An alternative implementation could be provided using digital equalization methods.

The signal is then fed to a balancing circuit 60 which couples the signal from the filter onto a twisted pair such as the twisted pair link 10. The balancing circuit ensures signal balance on the two twisted wires of the medium. This promotes good signal quality and again reduces radiated emissions. According to a preferred embodiment, the balancing circuit is formed with a transformer.

Figure 6:
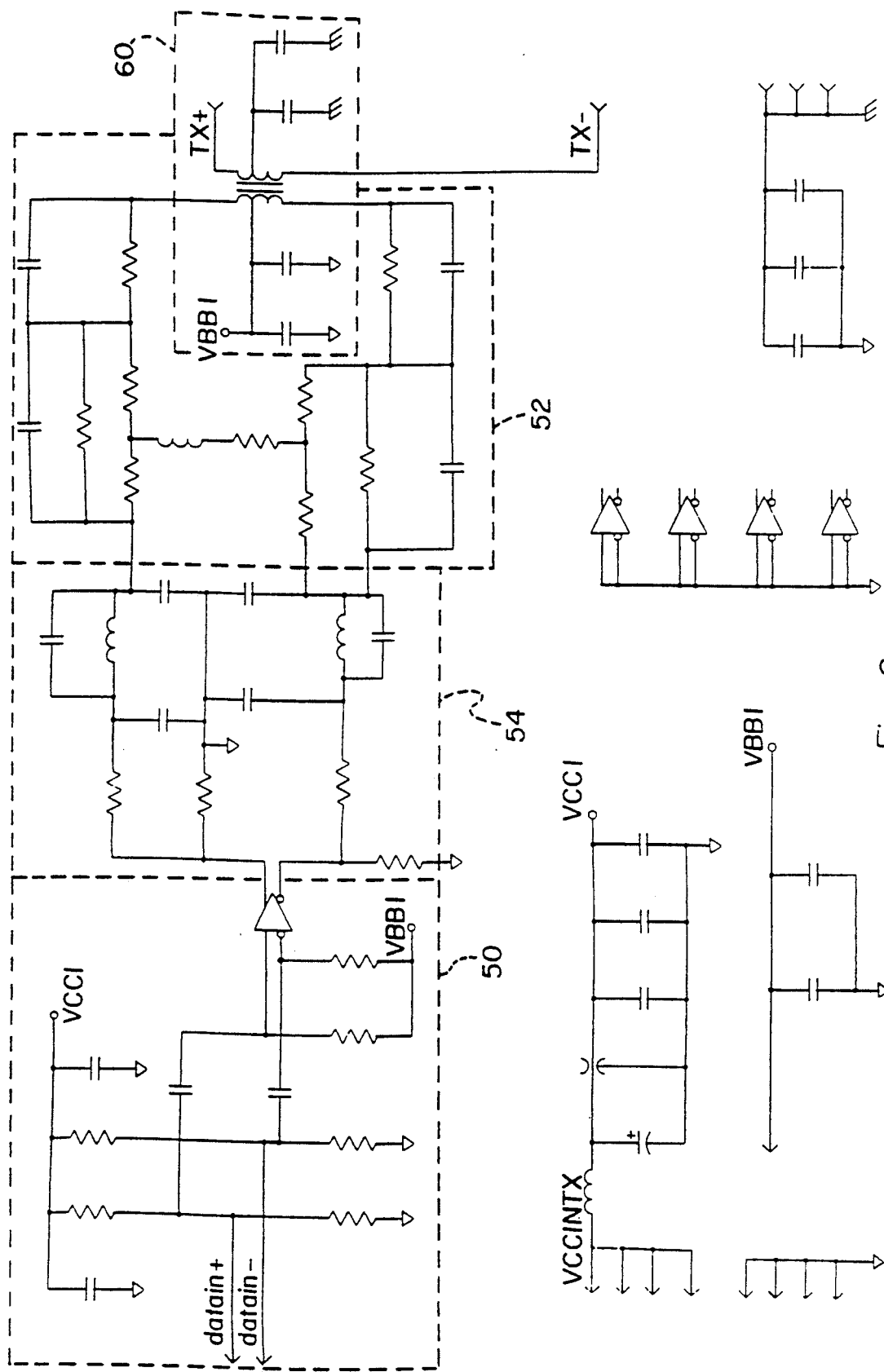
FIG. 6 is a circuit diagram of the high speed transmission link transmitter according to the invention.

FIG. 6 shows a preferred layout of the transmitter according to the invention. The values of the individual components shown in FIG. 6 will necessarily vary according to the impedance of the medium selected. For example, various impedances for twisted pair and coaxial media are commonly used, including 50, 75, 78, 93, 100 and 150 ohms.

Figure 8A:
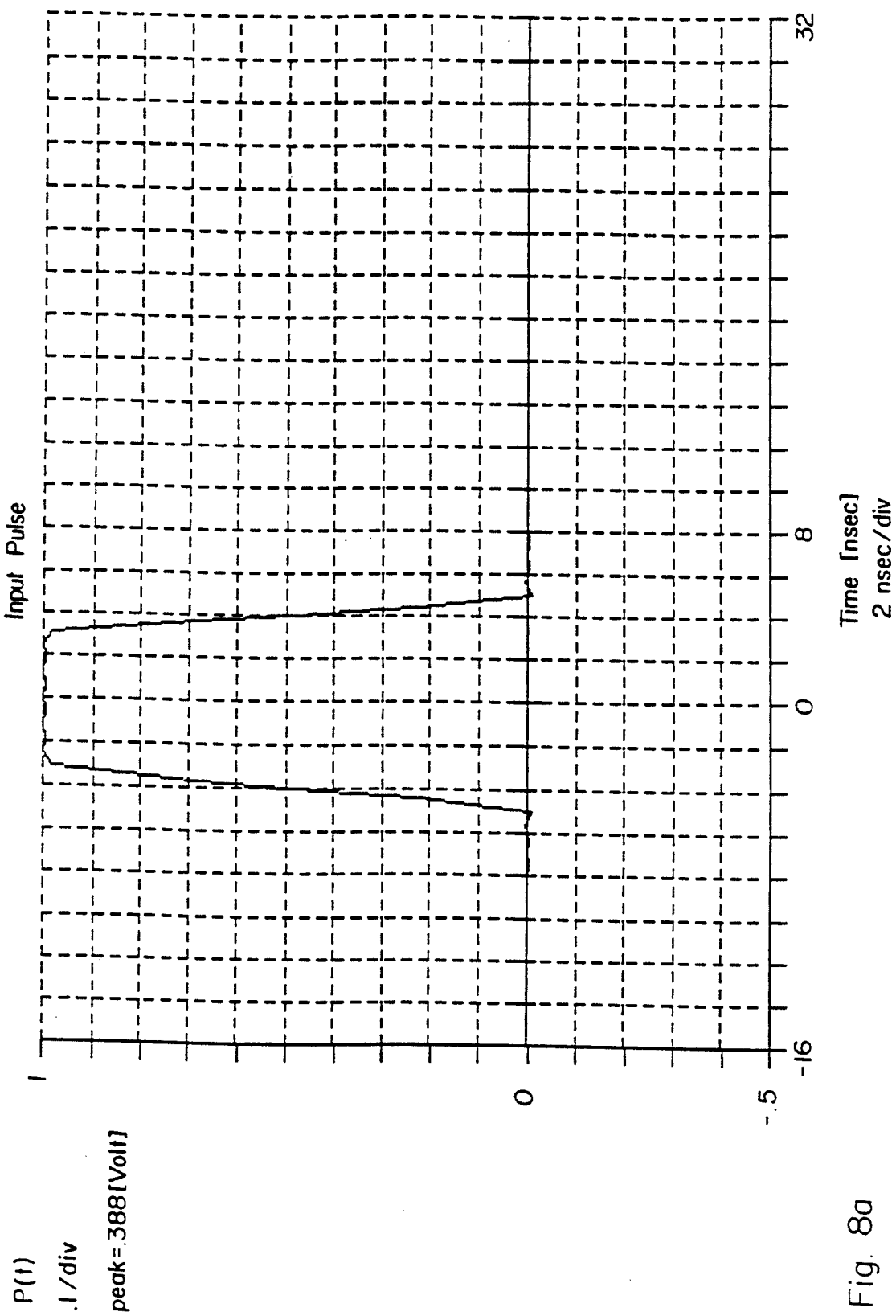
FIG. 8a is a diagram illustrating a logic "one" pulse as the input waveform to the transmitter (input transmit pulse)
Figure 8B:
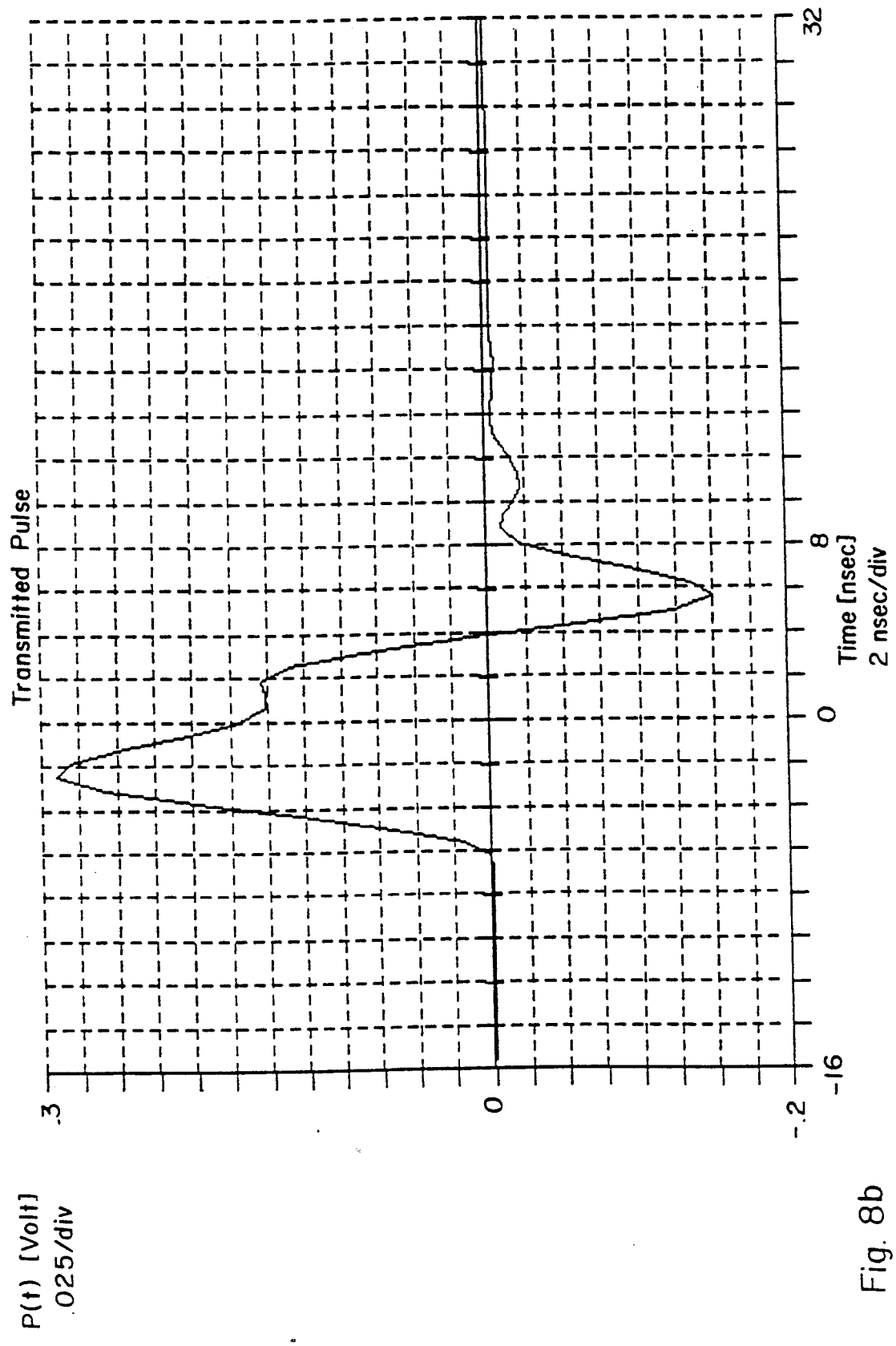
FIG. 8b is a diagram illustrating the output waveform, showing a logic "one" pulse conditioned by the buffer, equalizer and filter (output transmit pulse)
Figure 8C:
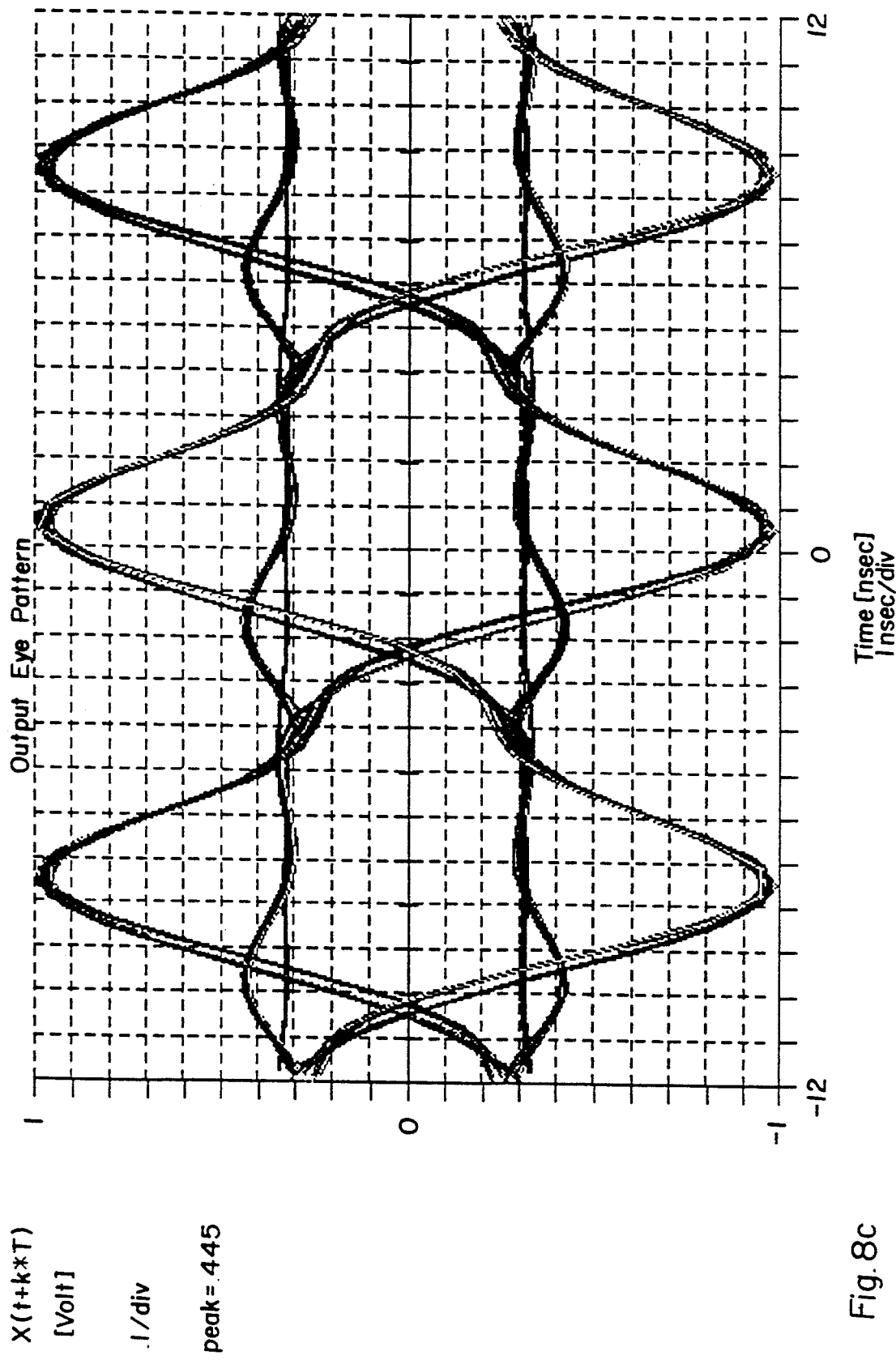
FIG. 8c is a diagram illustrating the transmitter "eye pattern" (illustrating all possible combinations of transmit data patterns superimposed on one another)

FIG. 8a shows a logic "one" pulse as an input waveform to the transmitter 40. This logic "one" pulse is an electrical data signal in the form intended to drive a fiber optic data interface. This input waveform is conditioned by the buffer 50, the equalizer 52 and the filter 54 to provide a logic "one" pulse output waveform as shown in FIG. 8b. FIG. 8c shows the transmitter "eye pattern". The transmitter "eye pattern" shown in 8c illustrates all possible combinations of transmit data pattern superimposed on one another.

As seen in FIG. 5, the receiver includes a filter 66, a buffer 68 and a signal detect circuit 70.

The filter 66 again serves mainly to reject signals outside the band of data signaling. This again acts to limit radiated emissions. The implementation again presumes using discrete passive components.

The buffer 68 receives the signal from the filter and serves to regenerate the signal received from the twisted pair medium back to adequate signal levels. According to the preferred embodiment, the buffer is implemented with cascaded line receivers designed in emitter-coupled logic technology.

The signal detect circuitry 70 is coupled to the output of the buffer 68 and distinguishes between the presence and absence of an input signal. The output of the signal detect circuit is a logical indication of signal presence. The implementation of the function in the preferred embodiment employs a peak detector circuit using the emitter-coupled logic technology, followed by a buffering gate.

Figure 7:
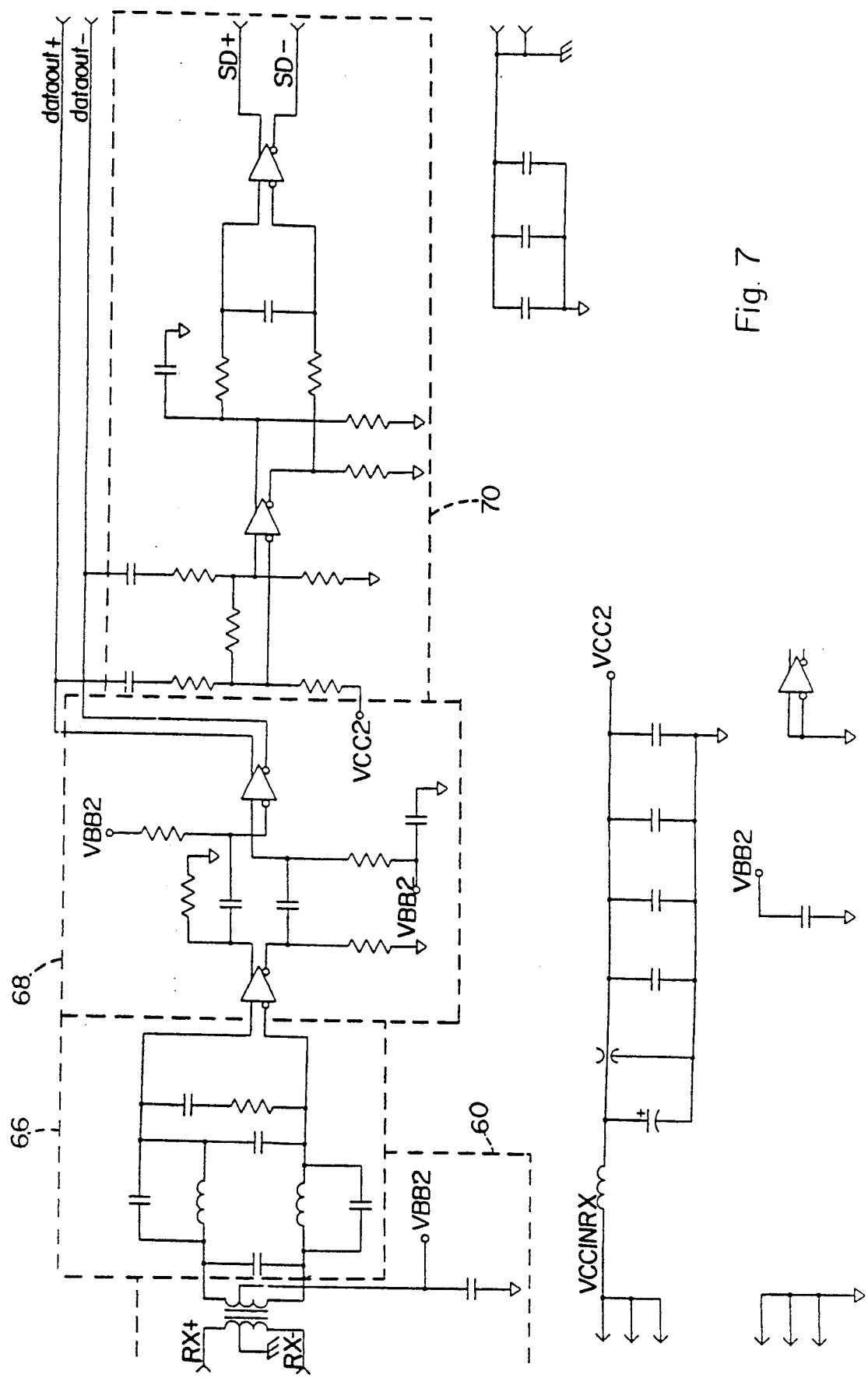
FIG. 7 is a circuit diagram of the high speed transmission link receiver according to the invention.

FIG. 7 shows in further detail a preferred layout of the high speed transmission link receiver according to the invention. The individual components have values which will necessarily vary according to the impedance and medium type selected for the transmission link.

Figure 9A:
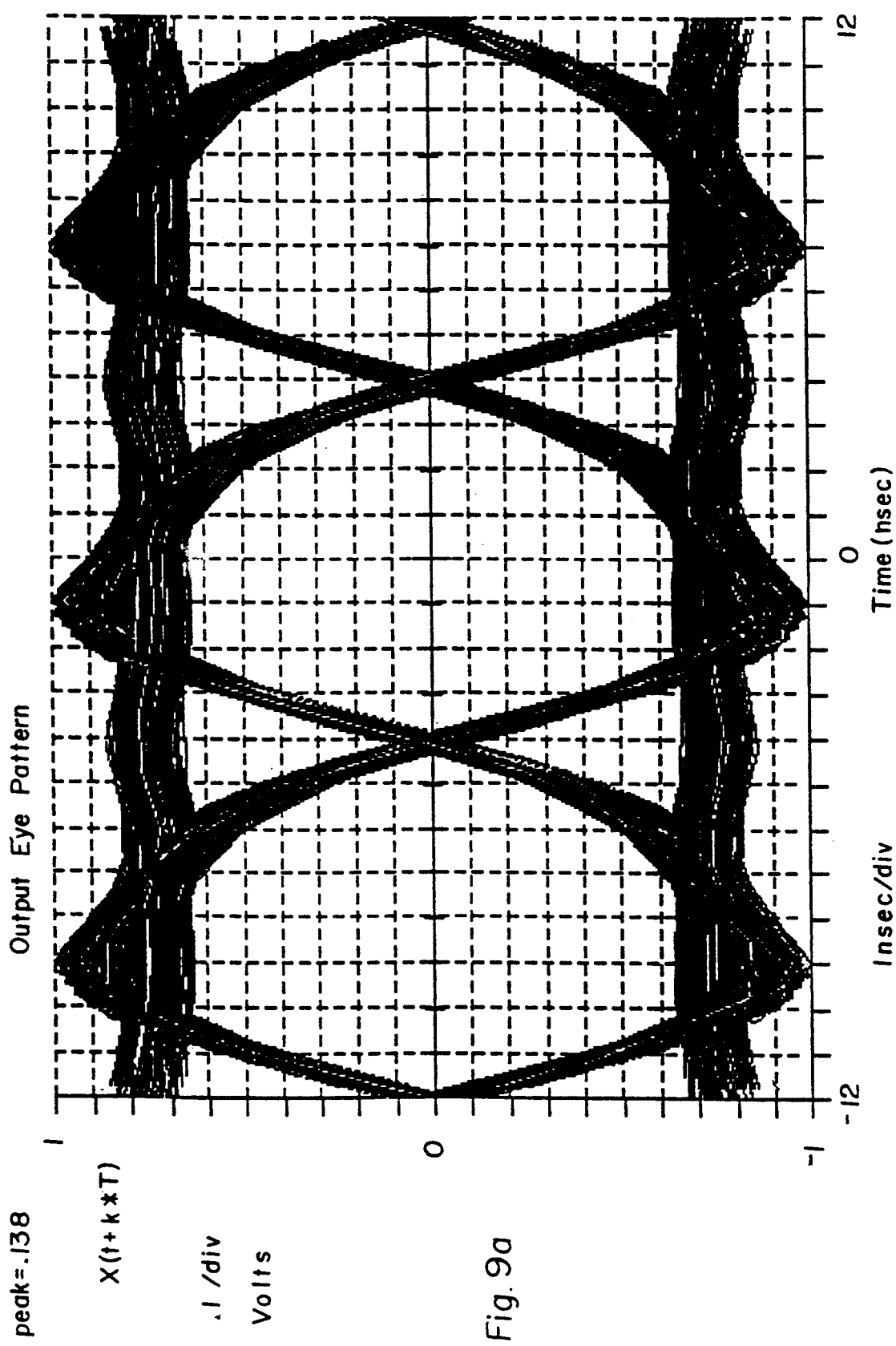
FIG. 9a is a diagram illustrating the eye pattern input to the receiver after transfer through 100 m of a typical twisted pair cable.
Figure 9B:
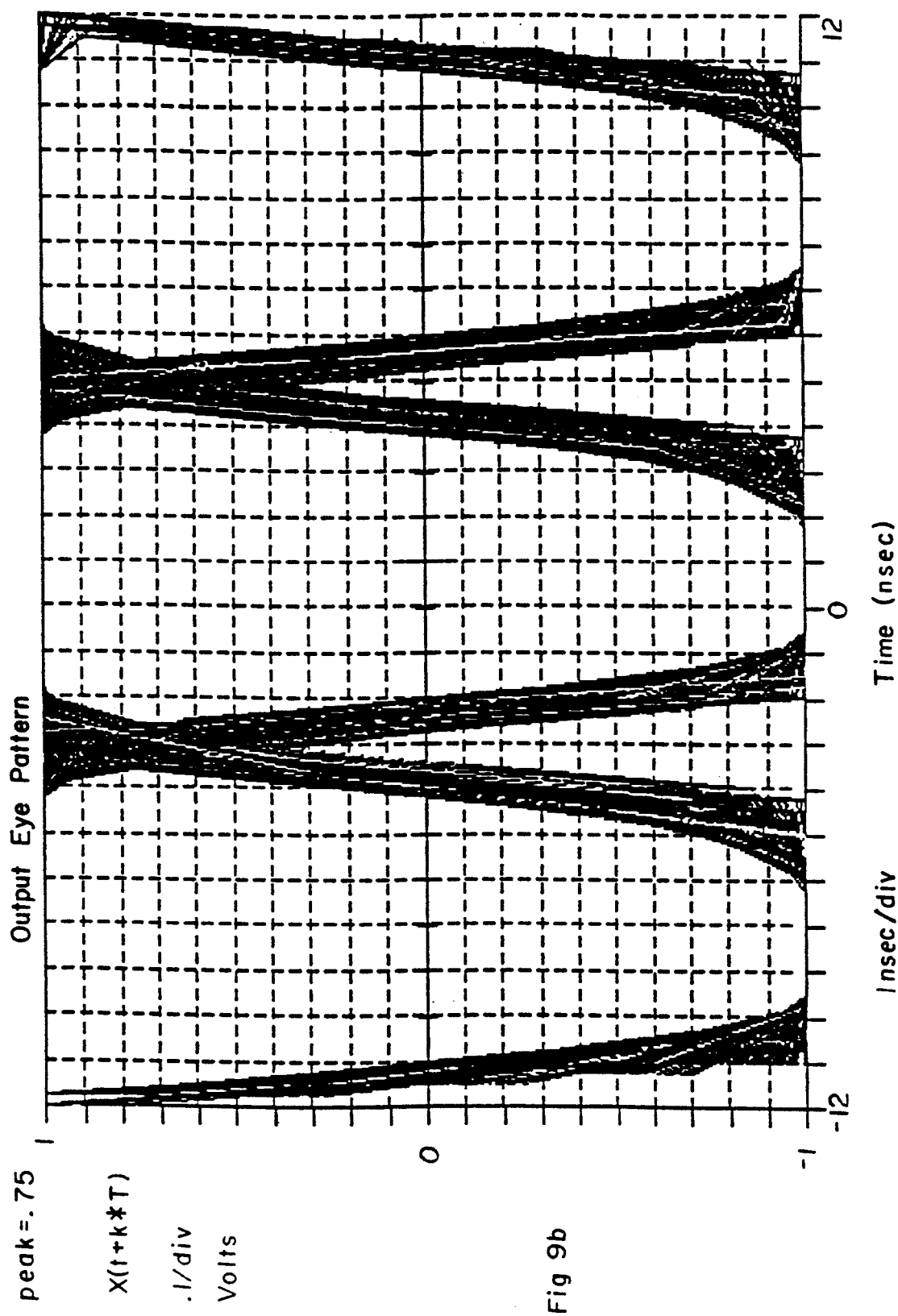

The input to the receiver after transfer through 100 m of a typical twisted pair cable is shown in FIG. 9a. This is a representation of all possible combination of receive data pattern superimposed on one another. The degree of opening of the "eye" is an indication of the ability of the receiver to accurately recover the data. FIG. 9b shows the eye pattern output of the receiver based on the input as shown in FIG. 9a.

While a specific embodiment of the invention has been shown and described in detail to illustrate the application of the principles of the invention, it will be understood that the invention may be embodied otherwise without departing from such principles.

What is claimed is:

1. An extremely high speed transmission link system for transmitting fiber optic data interface signals on a medium selected from twisted pair, shielded twisted pair, coaxial cable media or the like, comprising: a transmitter including conversion means for receiving the fiber optic data interface signals intended to drive a fiber optic data interface and said conversion means being also for converting said fiber optic data interface signals into high speed transmission link signals of a form suitable to drive said medium selected, said conversion means includes a buffer for receiving said fiber optic data interface signals and for forming said high speed transmission link signal via an equalizer and a filter, said equalizer amplifying specific frequencies of said high speed transmission link signals for counteracting frequency domain characteristics of the medium selected, said frequency domain characteristics which distort said fiber optic data interface signals and render said fiber optic data interface signals substantially unrecognizable, said filer rejecting signals from said high speed transmission link signals that are outside a band of data signaling; and, a receiver, connected to said transmitter by said medium selected said receiver including reconversion means for regenerating the signal received from said medium selected back to an adequate signal level.

2. An extremely high speed transmission link system according to claim 1, wherein: said medium is a balanced medium; and said transmitter further includes a balancing circuit for coupling a signal from said filter onto the medium selected, said balancing circuit ensuring signal balance on two wire portions of said medium selected, promoting good signal quality and reducing radiated emissions.

3. An extremely high speed transmission link system according to claim 1, wherein said receiver reconversion means includes a filter connected to said selected medium to reject signals outside a band of data signaling and to limit radiated emissions and a buffer for regenerating the signal received from the medium selected back to an adequate signal level.

4. An extremely high speed transmission link system according to claim 1, wherein said receiver includes signal detect circuit means for distinguishing between the presence and absence of an input signal.

5. An extremely high speed transmission link system according to claim 1, further comprising a concentrator platform including at least one channel, media dependent modules and slots connected to said at least one channel for receiving said media dependent modules, said media dependent modules connecting one of fiber optic medium or said selected medium to slots of said concentrator.

6. An extremely high speed transmission link system according to claim 5, wherein said concentrator platform includes signal channels connected to said modules and control means for controlling connections between said modules.

7. An extremely high speed network, comprising: a concentrator platform having at least one Fiber Distributed Data Interface (FDDI) channel; a plurality of high speed transmission links connected to said at least one FDDI channel of said concentrator, at least one of said high speed transmission links comprising a medium selected from twisted pair, shielded twisted pair and coaxial cable said medium having frequency domain characteristics which distort fiber optic data interface signals and render said fiber optic data interface signals substantially unrecognizable; a transmitter connected to said at least one high speed transmission link and including conversion means for receiving fiber optic data interface signals intended to drive a fiber optic data interface, said conversion means also being for converting said fiber optic data interface signals into high speed transmission link signals operating at rates up to 125 megabauds provided in a form suitable to drive said medium selected and overcome said frequency domain characteristics which distort said fiber optic data interface signals and render said fiber optic data interface signals substantially unrecognizable; and a receiver connected to said at least one high speed transmission link including reconversion means for regenerating the signal received from said medium selected back to an adequate signal level.

8. An extremely high speed transmission link system according to claim 7 wherein said conversion means includes a buffer receiving said fiber optic data interface signals and for forming said high speed transmission link signal via an equalizer and a filter, said equalizer providing frequency domain compensation to said high speed transmission link signal for the characteristics of the medium selected, said filter rejecting signals outside a band of data signaling to said high speed transmission link signal.

9. An extremely high sped transmission link system according to claim 7, wherein: said medium is a balanced medium; and said transmitter further includes a balancing circuit for coupling a signal from said filter onto the medium selected, said balancing circuit ensuring signal balance on two wire portions of said medium selected, promoting good signal quality and reducing radiated emissions.

10. An extremely high speed transmission link system according to claim 7, wherein said receiver reconversion means includes a filter connected to said selected medium to reject signals outside a band of data signaling and to limit radiated emissions and a buffer for regenerating a signal received from said filter of said receiver back to an adequate signal level.

11. A Fiber Distributed Data Interface (FDDI) transmission link system comprising:
   a medium transferring signals from one end of said medium to another end of said medium, said medium having frequency domain characteristics which attenuate specific frequencies of FDDI transmission line signals and render said FDDI transmission line signals substantially unrecognizable;
   a transmitter connected to said one end of said medium, said transmitter including a buffer means for receiving data intended to be transmitted over an FDDI transmission link as said FDDI transmission line signals, and for converting said data into medium transferrable FDDI signals, said transmitter including equalizer means for providing said medium transferable FDDI signals with frequency domain compensation for counteracting said frequency domain characteristics of said medium in order to render said medium transferrable signals recognizable after being transferred from said one end of said medium to said other end, said equalizer means providing said frequency domain compensation dependent on said frequency characteristics of said medium which distorts said FDDI transmission line signals; and
   a receiver connected to said another end of said medium, said receiver including reconversion means for receiving said medium transferrable FDDI signals from said medium and regenerating said data from said medium transferrable FDDI signals.

12. An extremely high speed transmission link system according to claim 11, wherein said receiver reconversion means includes a filter connected to said selected medium to reject signals outside a band of data signaling and to limit radiated emissions and a buffer for regenerating a signal received from said filter of said receiver back to an adequate signal level.

13. An extremely high speed transmission link system according to claim 11, wherein said receiver includes signal detect circuit means for distinguishing between the presence and absence of an input signal.

14. An extremely high speed transmission link system according to claim 11, further comprising a concentrator platform including at least one channel and slots connected to said at least one channel, media dependent modules for receiving said media dependent modules, one of said media dependent modules connecting said medium to said slots of said concentrator.

15. An extremely high speed transmission link system according to claim 14, wherein said concentrator platform includes signal channels connected to said modules and control means for controlling connections between said modules.

16. An extremely high speed transmission link system according to claim 14, wherein said concentrator platform includes power supply means for supplying power to installed modules.

17. A system in accordance with claim 11, further comprising;
   a plurality of electrically conductive media, each of said plurality of media having a corresponding transmitter and receiver, each of said corresponding transmitters having buffer means, equalizer means and filter means, said equalizer means of each of said transmitters providing frequency domain compensation depending on frequency domain characteristics of said corresponding medium; and
   a concentrator platform connected to one of said transmitters and receivers which correspond to said each of said plurality of media, said concentrator platform including signal channel means for transferring said data between said transmitters and receivers connected to said concentrator platform, said concentrator platform also including control means for establishing an FDDI Local Area Network (LAN) defined by ANSI X3T9.5 standard between said transmitters and receivers connected to said concentrator platform.

18. A Fiber Distributed Data Interface (FDDI) transmission link system comprising:
   a medium transferring signals from one end of said medium to another end of said medium, said medium having frequency domain characteristics which distort FDDI transmission line signals and render said FDDI transmission line signals substantially unrecognizable;
   a transmitter connected to said one end of said medium, said transmitter including a conversion means for receiving data intended to be transmitted over an FDDI transmission link as said FDDI transmission line signals, said conversion means being also for converting said data into medium transferrable FDDI signals and providing said medium transferable FDDI signals with frequency domain compensation for counteracting said frequency domain characteristics of said medium in order to render said medium transferrable signals recognizable after being transferred from said one end of said medium to said other end, said conversion means providing said frequency domain compensation dependent on said frequency characteristics of said medium which distorts said FDDI transmission line signals; and
   a receiver connected to said another end of said medium, said receiver including reconversion means for receiving said medium transferable FDDI signals from said medium and regenerating said data from said medium transferrable FDDI signals.

* * * * *